United States Patent [19]

Iwashita et al.

[11] 4,294,530
[45] Oct. 13, 1981

[54] MOTORIZED PHOTOGRAPHIC SYSTEM AND CAMERA AND POWER DRIVE UNIT THEREFOR

[75] Inventors: Tomonori Iwashita, Fuchu; Hidehiko Fukahori, Kawasaki; Yukio Mashimo, Tokyo, all of Japan

[73] Assignee: Canon Kabushiki Kaisha, Tokyo, Japan

[21] Appl. No.: 59,233

[22] Filed: Jul. 19, 1979

[30] Foreign Application Priority Data

Jul. 28, 1978 [JP] Japan .................................. 53-92318

[51] Int. Cl.³ .......................... G03B 1/18; G03B 1/60
[52] U.S. Cl. .................................... 354/173; 354/213; 354/214; 354/218
[58] Field of Search ............... 354/171, 173, 204–206, 354/213–215, 217, 218; 352/124, 172

[56] References Cited

U.S. PATENT DOCUMENTS

| | | | |
|---|---|---|---|
| 3,748,028 | 7/1973 | Iida | 352/172 X |
| 3,783,762 | 1/1974 | Sugimori | 354/173 |
| 3,878,546 | 4/1975 | Adamski | 354/173 |
| 4,015,198 | 3/1977 | Iwashita et al. | 354/173 X |
| 4,149,793 | 4/1979 | Date | 354/214 |

*Primary Examiner*—L. T. Hix
*Assistant Examiner*—William B. Perkey
*Attorney, Agent, or Firm*—Toren, McGeady & Stanger

[57] ABSTRACT

In the system disclosed, a motor drives a winding arrangement and a rewinding arrangement for advancing and rewinding the film in a camera in response to a first switch device that forms an electrical signal indicating completion of an exposure in the camera and a second switch device that indicates that the film has been rewound; the first and second switch devices being electrically connected to each other. The exposure completion and advance completion signals in the winding mode, and rewind stop completion signals in the rewind mode are multiplexed along the same line between the camera and the unit.

15 Claims, 9 Drawing Figures

MOTORIZED PHOTOGRAPHIC SYSTEM AND CAMERA AND POWER DRIVE UNIT THEREFOR

BACKGROUND OF THE INVENTION

This invention relates to a motor driven camera and to a motor drive unit removably attachable to the camera so as to form a system wherein the drive unit electrically winds the film in the camera, initiates release of the camera shutter, and the like.

In a motor driven camera, when the motor drive unit is removably attached to the camera body, it is necessary to transmit various control signals from the camera to the unit and from the unit to the camera. For this purpose, many electrical contact terminals are provided on both the camera body housing and the motor drive unit housing. In recently developed cameras, the use of many electronic devices in both the camera and the motor drive unit requires utilization of many signals transmitted therebetween. Thus, the number of interconnect terminals between the camera body and the motor drive unit tends to increase.

In general, a motor drive unit is attached to the bottom panel of a camera body housing by a fastener such as a tripod screw. Therefore, the aforementioned electrical contacts or terminals are arranged on the bottom panel of the camera housing and on the top panel of the motor drive unit casing with little protection from foreign particles such as dust and sand. Because these terminals are spring-biased, accumulation of a layer of particles on the interfaces betwen the contacts of the camera body and the drive unit is liable to cause insufficient electrical contact therebetween. Therefore, the larger the number of such signal transmission terminals, the lower the reliability of the resulting camera. Besides, as the bulk and size of a camera is reduced, it becomes more difficult to fit large numbers of terminals on the housing.

Even in a conventional motor driven camera, the various signals use a common return path to circuit ground. This has the effect of diminishing the number of interconnecting terminals. Further attempts at reducing the number of terminals involve, for example, generating a winding completion signal within the motor drive unit itself to obviate the necessity of transmitting this signal from the camera body to the unit in controlling the operation of the unit. However, the self-contained character of the completion signal within the motor drive unit increases the possibility of phase errors in synchronizing the operation of the camera body with the unit. In the past, this resulted in faulty operation of conventional motor driven cameras.

SUMMARY OF THE INVENTION

An object of the present invention is to eliminate these drawbacks of conventional motor driven cameras.

Another object of the invention is to provide a motor driven camera with a number of interconnect terminals reduced to a small a value as possible while still permitting all signals necessary for selectively performing the various modes of operation of the camera to be reliably transmitted between the camera body and the associated unit.

According to one aspect of the invention, signals from a winding completion switch and a rewinding completion switch in a motor driven camera are multiplexed so that the number of interconnect terminals between the camera body and the motor drive unit achieve an improvement in the reliability of instrument.

According to another feature of the invention, the drive unit comprises an electric motor, winding means driven by the motor, rewinding means driven by the motor for rewinding the film, a power line, and a pair of contacts interrupting the power line for receiving exposure completion signals and rewind completion signals through the same connecting means.

These and other features of the invention are pointed out in the claims. Other objects and advantages of the invention will become evident from the following description when read in light of the following drawings.

DETAILED DESCRIPTION OF PREFERRED EMBODIMENTS

Figure 1:
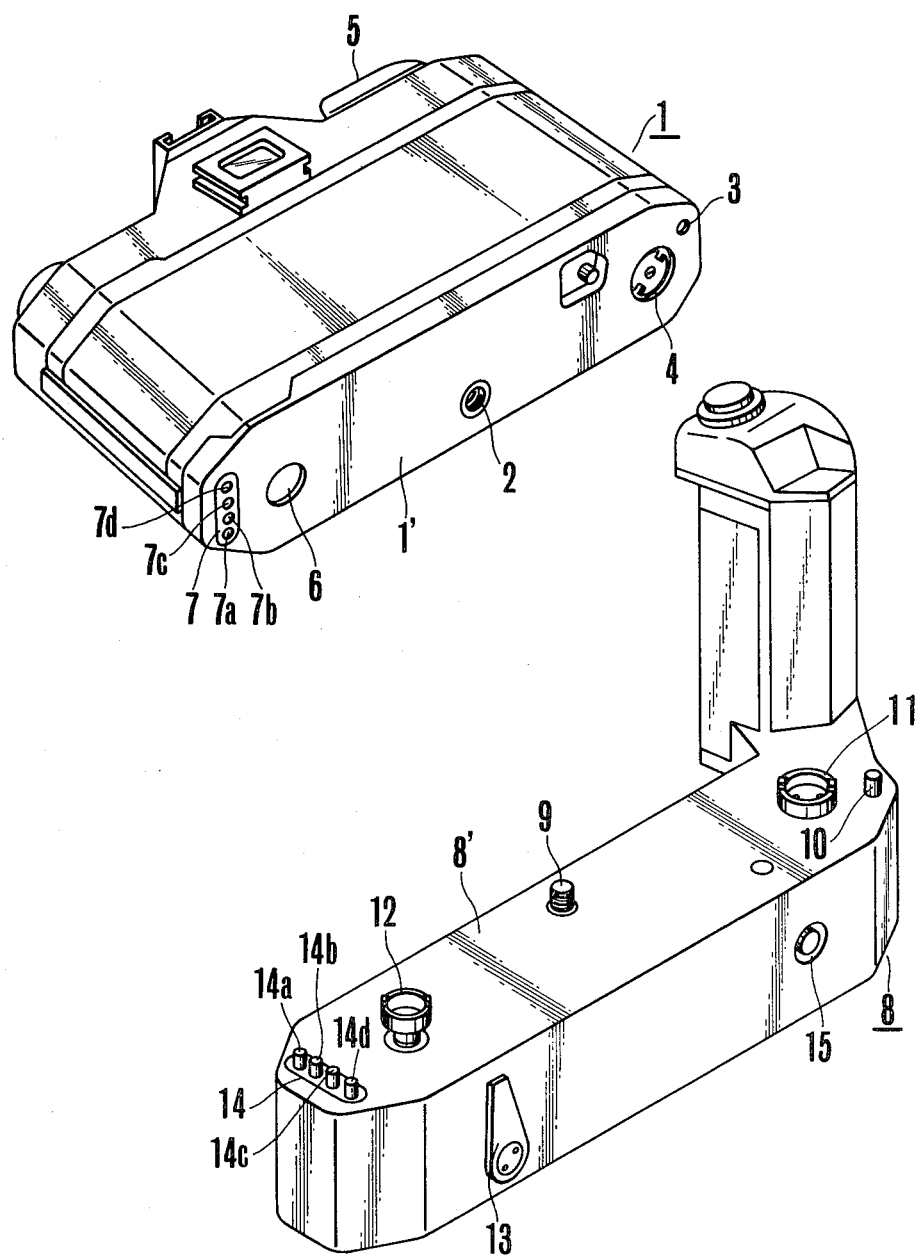
FIG. 1 is a perspective exploded view of a motor driven camera system composed of a camera and a motor drive unit embodying features of the invention.

In FIG. 1, a camera body 1 has a bottom panel 1' shaped for assembly with a motor drive unit 8. A threaded hole 2 for a tripod screw is adapted to have a fastener screw 9 of the motor drive unit 8 threadedly inserted therein for fixedly securing the motor drive unit to the camera body 1. A guide hole 3 and the fastening hole 2 align the drive unit 8 with the camera 1 and hence, determine the position of the attached motor drive unit. When the drive unit 8 is attached, a winding coupler 4 engages a winding coupler 11 of the motor drive unit 8.

The camera body includes a manual winding lever 5, and a rewind hole 6 into which a rewind coupler 12 of the motor drive unit 8 is inserted to connect to a film cartridge shaft (not shown) as the film can be rewound. A camera terminal portion is composed of four contacts or jacks 7a, 7b, 7c and 7d that are adapted to mate with four electrical plugs or terminals 14a, 14b, 14c and 14d on a portion 14 of the motor drive unit 8.

The motor drive unit 8 possesses an upper panel 8' shaped to assemble with the bottom panel 1' of the camera body 1; a fastener screw 9 adapted to be threadedly inserted into the tripod screw hole 2 of the camera body 1; and a guide pin 10 which, upon engagement with the guide hole 3 aligns the unit 8 on the camera 1. The winding coupler 11 serves, upon engagement with the coupler 4 of the camera body 1, to transmit a film winding driving force of the motor to the camera body. A rewind coupler 12, upon insertion into the hole 6 in the bottom panel of the camera body 1 engages the film cartridge shaft within the camera housing to rewind the film. A rewind lever 13 switches the motor drive unit 8 from the wind to the rewind mode. A light-emitting diode 15 indicates an operative condition of the motor drive unit 8. The camera body 1 and the motor drive unit 8 when assembled in fixedly secured relationship by the fastener screw 9 engaged with the female screw 2 function as a motor driven camera system.

Figure 2:
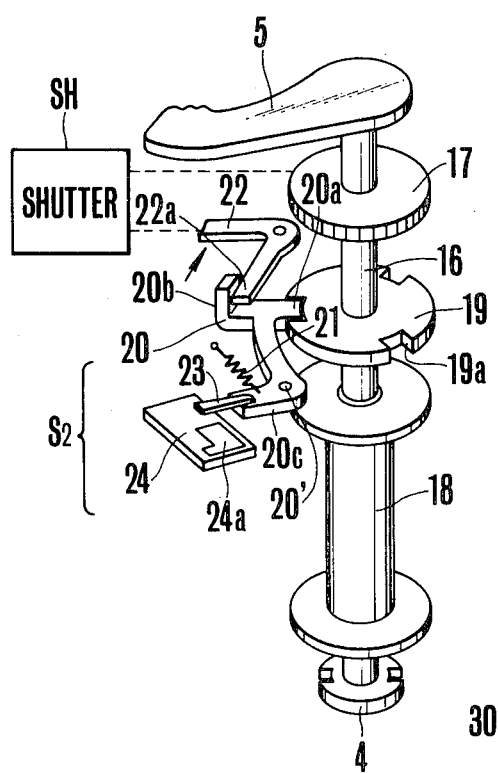
FIG. 2 is a perspective view illustrating switching arrangements in the camera of FIG. 1 for producing a winding completion signal.

FIG. 2 illustrates a winding completion switch in the camera of FIG. 1. The switch is composed of the winding coupler 4 and the winding lever 5, arranged on the bottom and top panels of the camera housing, respectively as shown in FIG. 1. A winding shaft 16 has the winding coupler 4 fixedly mounted at the lowermost end thereof and extends through a space within a takeup spool 18 to carry a notched disc 19. The shaft 16 carries a gear 17 which engages other means for cocking a shutter SH and the like, and carries a winding lever fixedly mounted on the top end thereof. A one-way clutch (not shown) may be provided between the winding shaft 16 and the winding lever 5 to enable the operator to perform a stepwise winding operation. In the proper position, the notched portions 19a of a disc 19 receive one end 20a of a stop lever 20. The stop lever 20 is pivoted at a shaft (not shown) at 20', and its upwardly extending portion 20b engages an intermediate lever 22, while the opposite end 20c fixedly carries a brush 23. The stop lever 20 is biased by a spring 27 to rotate in a clockwise direction. The intermediate lever 22 is moved in the direction of the arrow by a rear shutter curtain brake in the shutter SH, so that its one end 22a pushes the upwardly extending portion 20b of the stop lever 20, and turns the stop lever 20 counterclockwise against the force of the spring 21. The brush 23 slidingly moves on the pattern 24a of a print plate 24. The brush and the conductive pattern 24a of the print plate 24 form a switch S2. Then, when the shutter is cocked by the winding operation, the intermediate lever 22 moves in the direction opposite to that indicated by the arrow.

Figure 3:
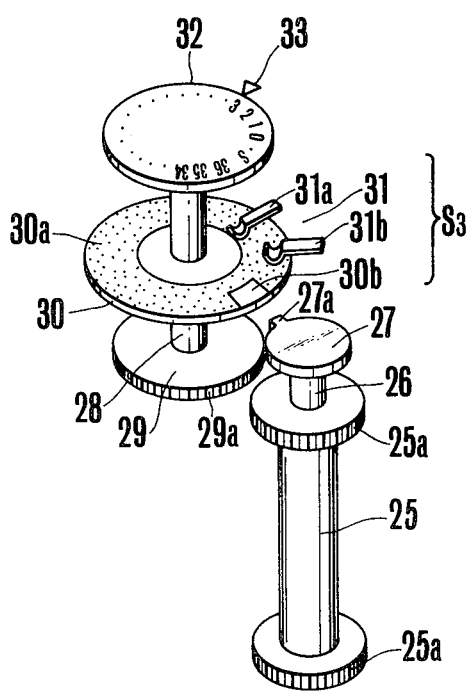
FIG. 3 is a perspective view of a switching arrangement in the camera of FIG. 1 for producing a rewind completion signal.

FIG. 3 illustrates an embodiment of a rewind completion switch in the motor driven camera of FIG. 1 according to the present invention. Here, a sprocket 25 having teeth 25A engages the perforations of a film (not shown) to advance the film one frame for one revolution of a sprocket shaft 26. A pinion 27 fixedly mounted on the top end of the shaft 26 has a tooth 27A which engages a gear 29 for each revolution of the pinion. The gear 29 is fixedly secured to the bottom of a counter shaft 28 rotatably mounted in the camera housing. Electrically conductive area 30a and insulated area 30b on the upper surface of a disc 30 cooperate with contact elements 31a and 31b which are pressed against the upper surface of the disc 30. These parts form a rewind completion switch S3. A round footage plate 32 cooperates with an index 33 for indicating the number of frames exposed.

Figure 4:
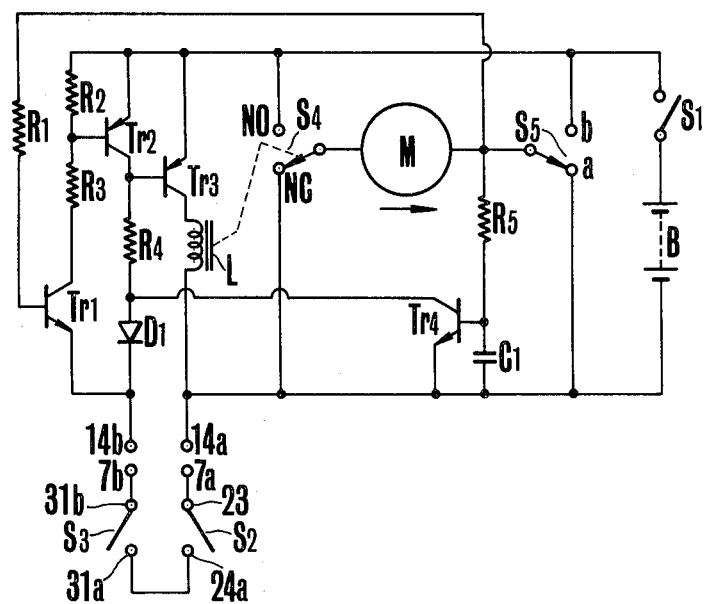
FIG. 4 is an electrical circuit diagram of the motor driven camera system illustrated in FIGS. 1, 2, and 3.

FIG. 4 is an electrical circuit diagram illustrating an example of an essential part of the circuitry of the motor driven camera of the present invention, wherein a winding completion switch and a rewind completion switch are connected in series with each other. The circuit includes an electrical power source or battery B, a main switch S1, an electric motor M whose forward rotation powers the winding operation and whose reverse rotation powers the rewinding operation, and a coil L of a relay for driving a switch S4. When the relay L is unenergized, the switch S4 is set to the position "NC", and when energized, it is set to the position "NO". The terminals 14a, 14b are those shown in FIG. 1 to be on the motor drive unit casing housing, and terminals 7a, 7b are those shown in FIG. 1 to be on the bottom panel of the camera housing. When the motor drive unit is attached to the camera body, the terminal 14a contacts the contact 7a, and the terminal 14b contacts 7b. The circuit further includes a windup completion switch S2 whose details are shown in FIG. 2, switch contacts 24a, a rewind completion switch S3 whose details are shown in FIG. 3 with its contacts 31a and 31b, transistors Tr1-Tr4, a diode D2, resistors R1-R5, and a capacitor C1, which together form a control circuit for the motor. A reversing switch SW5 cooperates with the rewind control lever 13 of FIG. 1. During exposure, i.e. release and winding, the switch SW5 is set at position "a". During rewinding, it is set to position "b".

In operation, the system is set to advance film by turning lever 13 and hence setting the switch S5 to the position "a" and turning the main switch S1 to energize the motor drive unit 8. If the film feed mechanism has been advanced to the end of a frame, i.e., when the camera is in a winding completion condition, then the end 20a of the stop lever 20 of FIG. 2 engages the cutout portion 19a in the disc 19. This causes the brush 23 to lose contact with the conductive area 24a of the pattern on the print plate 24, and hence, turns off the switch S2 in FIG. 4. When a film is now loaded into the camera, and the leader of the film is wound manually, the counter 32, 33 assumes a position "0". At this time, the contact members 31a and 31b of FIG. 3 contact the conductive area of the disc 30. Hence, the switch S3 is on.

In this condition, when the camera shutter is released by a mechanism (not shown), first the front curtain of the shutter runs down and then the rear curtain runs down. The braking arrangement of the rear curtain is then actuated and pushes the intermediate lever 22 in the direction indicated by the arrow in FIG. 2 so as to rotate the lever in the clockwise direction. Hence, its one end 22 pushes the upwardly extending 20b of the stop lever 20 to the left in FIG. 2. The stop lever 20 now turns counterclockwise about the pivot 20' against the force of the spring 21 and the end 20a is withdrawn from the cutout 19a of the disc 19. This enables the winding or film advance operation and causes the brush 23 to contact the conductive pattern 24A. Hence, the switch S2 is turned on.

Because the switch S3 is also turned on, the operation of the switch S2 energizes the transistors Tr1 and Tr2 because the switch S5 is in the position "a", the base of the transistor Tr1 is biased to ground through the resistor R1. This turns off transistor Tr1. Therefore, transistor Tr2 is also off so that transistor Tr3 is turned on to energize the coil L of the relay. This sets the switch S4 to the position "NO". A current now flows through the motor M in a direction indicated by the arrow so as to drive the motor M in the forward direction.

This operation, of course, assumes that the motor drive unit 8 is attached to the camera 1 and secured thereto by the screw 9 and hole 2.

As the motor M rotates in the forward direction, the winding coupler 11 on the drive unit 8 in FIG. 1 rotates and transmits the motion of the motor M to the winding coupler 4 on the camera body. This initiates a film advance or winding operation. During the winding operation, the sprocket 25 of FIG. 3 rotates one revolution, thereby causing the pinion 27 to rotate the gear 29 and advance the counter 32, 33 one frame. Toward the end of this film advance, the shutter is cocked and the intermediate lever 22 releases the stop lever 20 which the spring 21 biases against the outer peripheral edge of the turning disc 19. When a single frame has been completely advanced, a cutout 19a moves to the position of the end 20a and the latter is biased into the cutout. This stops the film advance operation. It also removes the brush 23 from contact with the conductive area 24a. This turns off the switch S2 in FIG. 4 and deenergizes the coil of the relay L.

Deenergization of the relay L moves the switch S4 to the position "NC". This cuts off the power supply to the motor M and short-circuits the latter so as to brake the motor and effect a rapid stop thereof. This procedure is repeated until all the frames, for example, 36 frames have been exposed.

During the next winding operation, the counter 32, 33 is at "36" and the contact element of FIG. 3 rides on the insulated area 30b so that the switch S3 is turned off. Because this occurs during completion of the winding operation, though the switch S2 remains on, the current supply to the relay coil is cut off by the switch S3 and the motor M deenergized. Because the motor is now short-circuited, a braking action is exerted to stop the motor from further rotation before a completed cycle of the winding operation is completed.

During the rewinding operation, the main switch S1 is on, the winding completion switch S2 is on since the cutout portion 19a has not been moved at, the position to be engaged with the end 20a before the completion of winding operation, the rewind completion switch S3 is off, and the relay switch S4 is in the position "NC". When an operator now shifts the rewind control lever 13, a rewind button in the camera is released by a mechanism, (not shown), and the rewind coupler 12 moves upward to engage the cartridge shaft within the camera housing. The lever 13 also changes the switch S5 of FIG. 4 from position "a" to position "b". A capacitor C1 now starts charging through the resistor R5. The time constant of the RC circuit R5 and C1 is adjusted to a value shorter than the time necessary for completely rewinding the film and longer than the time necessary to rewind the film one frame. During the time determined by the time constant R5 and C1, therefore, the transistor Tr4 remains off. Because the transistor Tr3 does not conduct, (switch S3 is off), no current flows through the relay coil L. This sets the switch S4 to the position "NC". Thus, the motor is supplied with current flowing in a direction opposite to that indicated by the arrow and rotates in the reverse direction.

Motion of the motor M is transmitted to the rewind coupler 12 and therefrom to the cartridge shaft, at the start of the rewinding operation. As the rewinding of the film proceeds, the sprocket 25 of FIG. 3 rotates in a direction opposite to that of the winding operation. This causes the pinion 27 to rotate the counter 32, 33, through the gear 28, in the reverse direction and causes the indications to decrease.

When the contacts 31a and 31b arrive at the conductive area and close the switch S3, the switch S5 at the position "b" biases the transistor Tr1 on, which in turn renders transistor Tr2 conductive. This causes transistor Tr3 to remain off. Hence, the rewinding operation continues.

When the time dependent upon the RC circuit R5 and C1 has elapsed, the transistor Tr4 is turned on. However, this does not turn on transistor Tr3 because with switch S3 on the conductive transistors Tr1 and Tr2 keep the transistor Tr3 off.

When the film nears the end of its movement, that is, when the leader of the film leaves the takeup spool, the counter 32, 33 reaches "S". At this position, the contact 31b contacts the insulated area 30b, and therefore, turns off switch S3. This turns off transistors Tr1 and Tr2, and the transistor Tr4 turns on the transistor Tr3. This energizes the relay L and switches the switch S4 to the position "NO". At this time, because the switch S5 is in the position "b", the motor M is short-circuited and stops rapidly due to the braking action of the short-circuit. This completes the rewinding operation.

Figure 5:
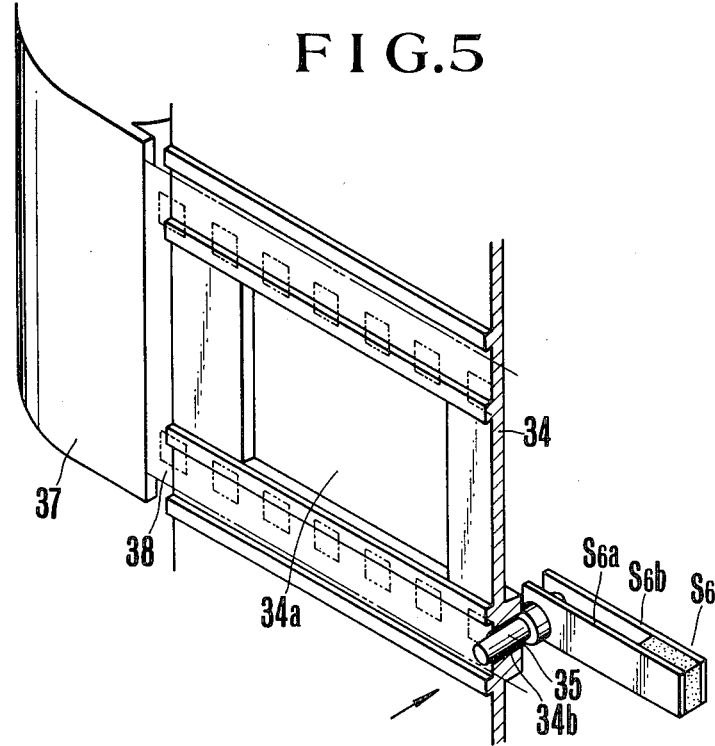
FIG. 5 is a perspective view of a switching arrangement in a camera such as that of FIG. 1 for producing a rewind completion signal and embodying features of the invention.
Figure 6:
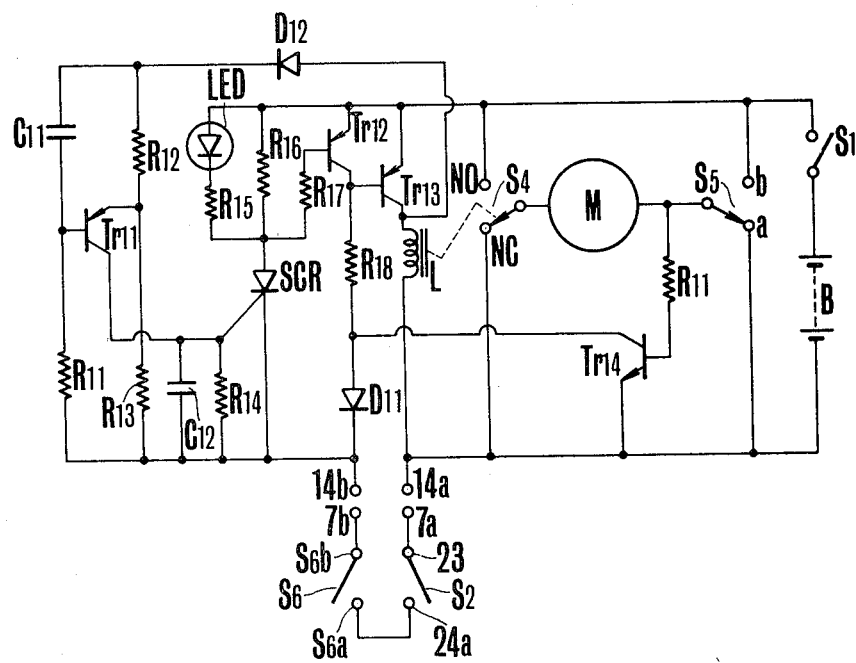
FIG. 6 is an electrical circuit diagram of another embodiment of a motor driven camera according to the present invention and employing the arrangement of FIG. 5.

A second embodiment of the invention appears in FIGS. 5 and 6. Here, the parts which are the same as those in FIGS. 1 and 2 are identified with the same reference characters. This new embodiment utilizes a rewind completion switch different from the one shown in FIG. 3 and a different circuit than the one shown in FIG. 4.

The rewind switch mechanism of this embodiment appears in the perspective view of FIG. 5 which shows the framing aperture and the structure in its vicinity in a camera body such as 1 with the back cover open. Here, a plate 34 constituting a part of the camera body 1 forms an aperture 34a and a guide hole 34b passing through the plate. A pin 35 fits in the hole 34b and is slideable in the direction indicated by the arrow when pushed by the loaded film 38. When the film 38 is removed, the pin 35 extends into the path of movement of the film 38.

Two contacts S6a and S6b of a switch S6 are arranged to contact each other when the film 38 depresses the pin 35 in the direction of the arrow. That is, the switch S6 functions as a rewind completion switch and is connected in series with the winding completion switch S2 as shown in FIG. 2. The film 38 emerges from a film cartridge 37.

In FIG. 6, parts corresponding to those of FIG. 4 utilize the same reference characters. The circuit of FIG. 6 furnishes a timer circuit for detecting when the winding operation takes a longer time than usual, as for example, when the film becomes stuck or it otherwise becomes impossible to move the film. The circuit further provides switching means for indicating that the film is not moving at the usual rate. Here, the circuit differs from that of FIG. 4 by virtue of the rewind completion switch S6 and its contacts S6a and S6b, transistors Tr11 to Tr14, diodes D11 and D12, thyristor SCR, and a light emitting diode LED for indicating the end of the film and a rewinding operation.

This embodiment of the invention, shown in FIGS. 1, 2, 5 and 6 is as follows. For winding, the switch S5 is set to the position "a" and the main switch S1 is turned on. Assuming that the camera is in a condition in which the film winding arrangement has moved to the position where it would have completed advancing the film a frame, i.e., the winding-completion condition, as described in connection with the first embodiment, the switch S2 is turned off. If a film is now loaded in the camera and the leader advanced, the pin 35 of FIG. 5 is pushed in the direction of the arrow to turn on the switc S6. Actuation of the shutter release of the camera (by a mechanism not shown) is followed by the front shutter curtain running down and then the rear shutter curtain running down. The latter terminates with actuation of a braking arrangement, as previously mentioned. This turns on the switch S2 and the transistor Tr13 is turned on to energize the relay L. This switches the switch S4 to the position "NO". As a result, the motor M rotates in the forward direction and winds the film.

Turning the switch S6 on as a result of the pin 35 being moved, forms a current path to ground for the capacitor C11. Turning on transistor Tr13 starts charging of the capacitor C11 through the diode D12 and the resistor R11.

The time constant of C11, R11 is longer than the normal winding period of one frame. Hence, during the normal single frame winding operation, the transistor Tr11 is maintained off. This keeps the thyristor SCR, which is otherwise triggered by the output of the transistor Tr11, off. The transistor Tr12 now remains off, and the light-emitting diode LED is not lit. Upon completion of one winding operation by the forward rotation of the motor M, the winding completion switch S2 is turned off, so that the transistor Tr13 is turned off, to thereby deenergize the relay L. The switch S4 is then changed to the position "NC" where the motor M is short-circuited and braked to rapidly stop. Thus, the camera is made ready to make the next exposure.

After the last film frame has been exposed, the next winding operation starts. However, no more film can be drawn from the film cartridge and it is impossible to wind the film as usual. In this state, the switch S2 is on, and therefore the motor M is on. On the other hand, in the predetermined time interval, (longer than the normal single frame winding period) from the time the capacitor C2 starts charging when the winding operation is initiated, the time constant circuit of C11, R11 turns on the transistor Tr11. This triggers the thyristor SCR. The transistor Tr12 is then turned on and the transistor Tr13 is turned off to deenergize the relay L. The relay switch S4 is now changed to position "NC". Thus, the motor M is rapidly stopped by its short-circuit braking action. The conduction of SCR causes the light-emitting diode LED to be turned on so that it indicates the fact that no fresh frame is available.

This is following by a rewinding operation. The switches S1, S2 and S6 are not all on, and switch S4 is in position "NC". Hence, when the rewind control lever 13 is operated, the rewind control button on the camera body is released by a mechanism (not shown) to move the rewinding coupler 12 upwardly until it engages the film cartridge shaft, and the switch S5 is moved from position "a" to position "b". The transistor Tr14 is thus turned on. At this time, however, the thyristor SCR remains on, and the transistors Tr12 and Tr13 are on and off respectively so that the motor M is supplied with a reverse current from the terminal "b" of S3 through the terminal "NC" of S4, and rotates in the reverse direction to perform the rewinding operation.

When the rewinding action causes the cartridge to draw the film leader away from the pin 35 of FIG. 5, the pin 35 slides in the direction opposite to that indicated by the arrow to allow the turning off of switch S6. The thyristor SCR and transistor Tr12 are then turned off, and the transistor Tr13 is turned on to energize the relay L. The relay switch S4 is now changed to position "NO". Thus, the motor M is short-circuited to brake to a rapid stop, and the LED is simultaneously quenched to indicate that the rewinding operation is completed.

Figure 7:
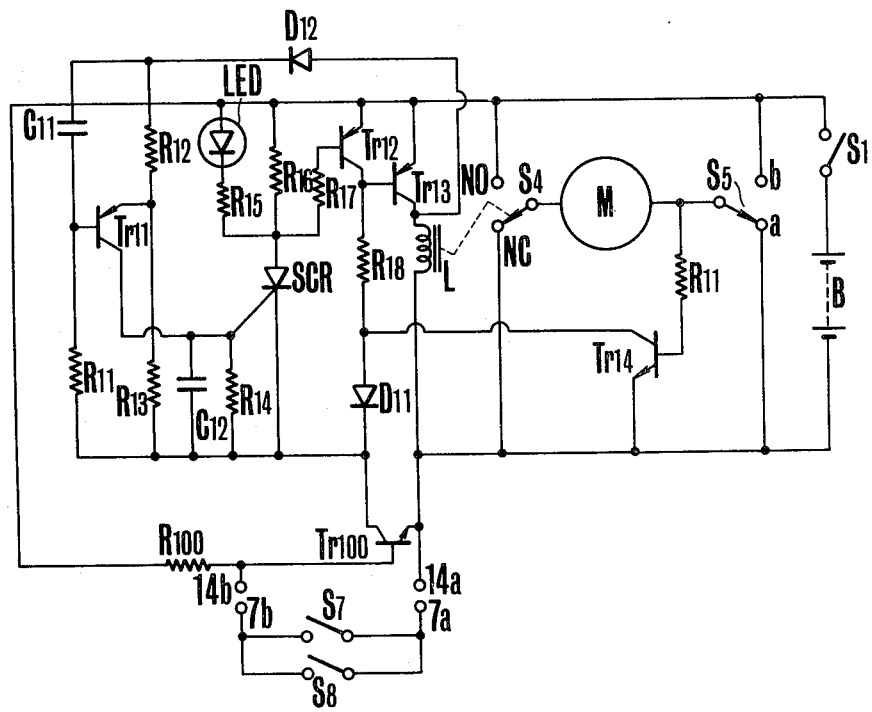
FIG. 7 is an electrical circuit diagram showing still another embodiment of the present invention.
Figure 8:
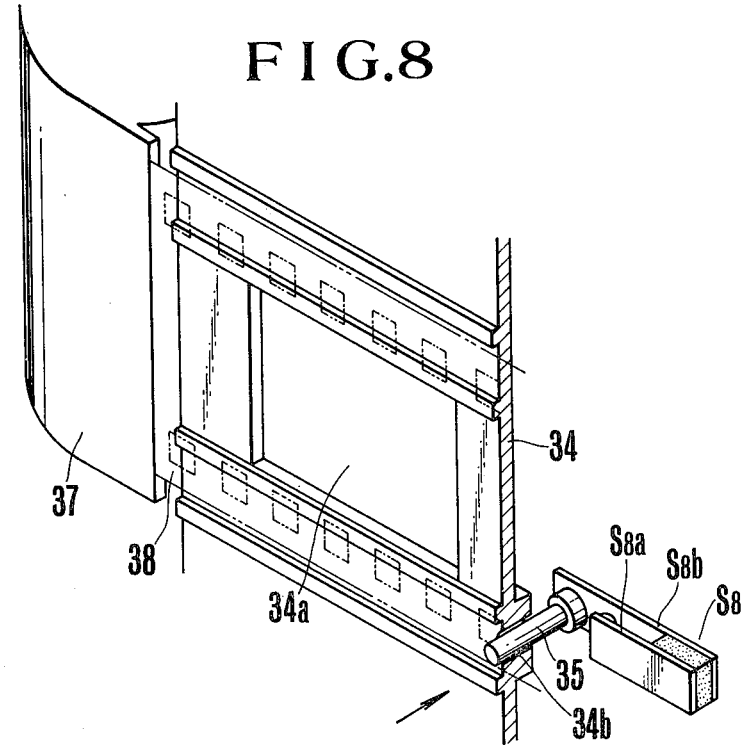
FIG. 8 is a perspective view illustrating still another example of a switching arrangement for producing a rewind completion signal and embodying features of the invention.
Figure 9:
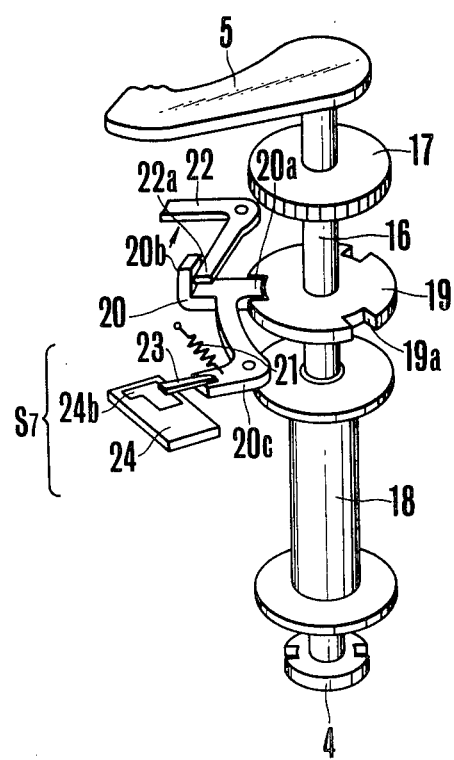
FIG. 9 is a perspective view of a switching arrangement for producing a winding completion signal embodying features of the invention.

The embodiments in FIGS. 7 to 9 differ from the previous embodiments in that the on and off states of the winding completion switch S7 and the rewind completion switch S8 are reversed.

FIG. 9 shows the construction of the windup completion switch S7. This construction is almost the same as in FIG. 2, except that the contacts 23 and 24b form a switch S7 which is closed when the winding operation is completed, and opened when the exposure operation is completed. FIG. 8 shows an embodiment of a rewind completion switch S8. This switch S8 operates in a manner reversed to that of switch S5 in FIG. 5. That is, switch S8 is turned off when the film is loaded, and on when the film is removed.

The embodiment employing the switches S7 and S8 is shown in FIG. 7. The circuit shown in FIG. 7 is the same as that of FIG. 6 except for the parallel connection of the switches S7 and S8 and the provision of a transistor Tr100 whose operation is controlled by the both S7 and S8.

In operation, the switch S1 is turned on and the switch S5 is set to position "a" for film advance. While the shutter is open for exposing film, the switch S7 is on, thereby turning the transistor Tr100 off by short-circuiting its emitter-base path. As a result, transistor Tr13 is off, relay L is deenergized, and the motor M short-circuited, and hence, stationary. When the exposure operation has been completed, the lever 22 turns off the switch S7, thereby turning on transistor Tr100 by virtue of the current flow through the resistor R100. Conduction of the transistor Tr100 biases the transistor Tr13 on, energizes relay L, shifts switch S4 to position "NO", and moves the motor M in the forward direction. This starts the winding operation. When the winding operation has been completed, the switch S7 is turned on again causing the transistor Tr100 to turn off, the transistor Tr13 to turn off, relay RL to deenergize, and the motor M to be short-circuited and stop.

If, at some intermediate point during the winding operation, no more film for a fresh frame is available from the cassette, the winding operation cannot be completed and the time of the winding operation exceeds the time of the timer circuit R11, C11. Because the switch S7 is off and the transistor Tr100 is on, this causes the transistor Tr11 and the thyristor SCR as well as the transistor Tr12 to turn on. This turns off the transistor Tr13, deenergizing the relay L, moves the switch S4 to position "NC", and short-circuits the motor M and stops it. This interrupts the winding operation.

If now, in the active state of the timer, when transistor Tr12 is on, transistor Tr13 is off, switch S7 is off, and switch S8 is off, the rewind control lever 13 is operated to change the switch S5 to the position "b", the motor starts to rotate in the reverse direction to rewind the film. When the rewinding operation is completed and the film no longer presses the contact switch S8, the latter is turned on and the transistor Tr100 turned off. This deactuates the timer circuit causing the transistor Tr12 to be turned off.

During the rewinding operation, as the result of the switch S5 being set to "b", the transistor Tr14 is turned on. However, during the rewinding operation, the on transistor Tr12 prevents from turning on transistor Tr13. When the rewinding operation is completed, and the off transistor Tr100 biases off transistor Tr12, the on transistor Tr14 turns on transistor Tr13. This energizes relay L, shifts the switch S4 to position "NO" and short-circuits the motor M to rapidly stop it. This automatically stops the rewinding operation. Again, upon completion of the rewinding operation, the transistor Tr100 is turned off and the thyristor SCR is turned off to deenergize the LED.

As described in detail with respect to these embodiments, the motor driven camera of the present invention contemplates connection of a winding completion switch and a rewinding completion switch so that winding and rewind control signals are transmitted between the camera body and the motor drive unit through a common terminal-to-terminal connection. This affords the advantage that the otherwise necessary number of interconnections between the camera body and the motor drive unit are reduced with a consequent reduction in the possibility of faulty operation due to signal transmission error therethrough. It should be noted that the winding completion control switch in these embodiments serves as the release completion control switch. Therefore, the transmission of three signals in effect can be made with the use of two terminals, one of which is of course connected to ground.

While embodiments of the invention have been described in detail, it will be evident to those skilled in the art that the invention may be embodied otherwise without departing from its spirit and scope.

What is claimed is:

1. A motor drive unit for a camera comprising:
   an electric motor,
   a control circuit connected to said electric motor to control the electrical power supply to said motor, said control circuit having a control input and responsive to at least an electrical control signal applied to said input for controlling the electrical power to said motor,
   terminal means connected to the input of said control circuit to receive from the camera a combination signal including a first electrical signal indicating completion of a winding operation for advancing film one frame and a second electrical signal indicating completion of a rewinding operation for rewinding film in the camera, the combination signal representing winding completion signal when the first and second signals assume one set of states, and rewind completion signal when the first and second signals assume another set of states, and
   a motion transmitting mechanism for transmitting the driving force of said electric motor to the camera to perform a winding or rewinding operation.

2. A motor drive unit according to claim 1, wherein said control circuit includes semi-conductor switch means responsive to receipt of an electrical control signal from said input, for controlling electrical power to said motor on the basis of the state of conduction of said semi-conductor switch means.

3. A motor drive unit according to claim 1, wherein said motor transmitting mechanism includes a first coupler for engaging with a winding mechanism in the camera, and a second coupler for engaging a rewinding mechanism in the camera.

4. A camera system having a motor drive unit for winding and rewinding film when film is mounted in the system, comprising:
   an electric motor,
   an electrical power supply control circuit for giving driving energy to said motor,
   winding means couplable to said motor for successively performing film winding operations in which film is wound one frame for each operation,
   rewinding means couplable to said motor for rewinding film when film is in the camera,
   exposure means made ready for exposure by said winding means,
   first switch means for forming a first electrical signal indicating completion of exposure by said exposure means,
   second switch means for forming a second electrical signal in relation to the completion of a rewinding operation, and
   said first and second switch means being electrically connected to each other and for producing a first output when the switch means assume one set of states and a second output when each assumes another set of states.

5. A system as in claim 4, wherein said first and second switch means produce the first output when the switch means assume the same state and the second output when the switch means assume opposite states.

6. A system as in claim 4, wherein said first switch means assumes an ON state in response to completion to an exposure, and an OFF state when the film is wound, and that said first switch means and said second switch means are connected in series with each other.

7. A system as in claim 4, wherein said first switch means assumes an OFF state in coaction with completion of an exposure, and an ON state in coaction with completion of a winding operation, and said first switch means and said second switch means are connected in parallel with each other.

8. A system as in claim 4, further comprising a film frame counter coupled with said second switch means to switch said second switch means when the counter reaches a predetermined number.

9. A system as in claim 4, wherein said second switch means includes contact means in the path of movement of the film for changing the operating state of the film.

10. For use with a motor drive unit having an electric motor responsive to a control signal for causing film to be power wound or rewound and a motor control circuit as well as electrical signal receiving terminals, a camera comprising:
    exposure means for performing a film exposure operation,
    film advancing means for performing a successive film winding operation,
    film rewinding means for performing a film rewinding operation,
    first signal forming means for producing a first electrical signal in coaction with at least one of the exposure and winding operations,
    second signal forming means for producing a second electrical signal in coaction with the completion of a rewinding operation,
    circuit means for combining the first signal and the second signal and producing a first output representing a winding or winding completion signal and a second output representing rewinding or rewinding completion signal, and
    transmission terminal means connected to the circuit means for feeding out the first output and the second output as an electrical control signal to the unit.

11. A camera according to claim 10, wherein:

said second signal forming means is coupled to a film counter and forms a signal when said counter reaches a predetermined number.

12. A camera according to claim 10, wherein
said second signal forming means includes a contact member in the path of movement of film in the camera and forms a signal when the film is taken out of contact with said contact member as the film rewinding operation is completed.

13. For use with a motor drive unit having an electric motor responsive to a control signal for causing film to be power wound or rewound and a motor control circuit as well as electrical signal receiving terminals, a camera comprising:
exposure means for performing a film exposure operation,
film advancing means for performing a successive film winding operation,
film rewinding means for performing a film rewinding operation,
first signal forming means for producing a first electrical signal in coaction with at least one of the exposure and winding operations,
second signal forming means for producing a second electrical signal in coaction with the completion of a rewinding operation,
transmission terminal means coupled to each of said first and second signal forming means for feeding out the electrical signals from both means as an electrical control signal to the unit,
said first signal forming means including an electrical switch, said switch being turned OFF upon completion of a winding operation, and ON upon completion of an exposure operation,
said second signal forming means including a second electrical switch turned OFF upon completion of rewinding,
said first and second switches being connected in series with each other and to said transmission means.

14. For use with a motor drive unit having an electric motor responsive to a control signal for causing film to be power wound or rewound and a motor control circuit as well as electrical signal receiving terminals, a camera comprising:
exposure means for performing a film exposure operation,
film advancing means for performing a successive film winding operation,
film rewinding means for performing a film rewinding operation,
first signal forming means for producing a first electrical signal in coaction with at least one of the exposure and winding operations,
second signal forming means for producing a first electrical signal in coaction with the completion of a rewinding operation,
transmission terminal means coupled to each of said first and second signal forming means for feeding out the electrical signals from both means as an electrical control signal to the unit,
said first signal forming means including an electrical switch arranged to turn ON upon completion of a winding operation and OFF upon completion of an exposure operation,
said second signal forming means including a second electrical switch arranged to turn ON upon completion of a rewinding operation, and
said first and second switches being connected in parallel with each other and to said transmission terminal means.

15. A motor driven camera system comprising:
an electric motor,
an electrical power supply control circuit for supplying driving energy to said motor,
exposure means prepared for performing exposure operations and drivingly connected to said motor,
rewinding means coupled with said motor when the film is rewound,
first signal forming means for forming a first electrical signal upon completion of an exposure operation,
second signal forming means for forming a second electrical signal upon completion of a rewinding operation by said rewinding means, and
a connection circuit for connecting said first and said second signal forming means with each other to form a combination signal with both of said signal forming means, said connection circuit being operatively coupled with said control circuit.

* * * * *